Sept. 15, 1970   J. C. JENKINS   3,528,634
PIPE HANGER
Filed June 18, 1968
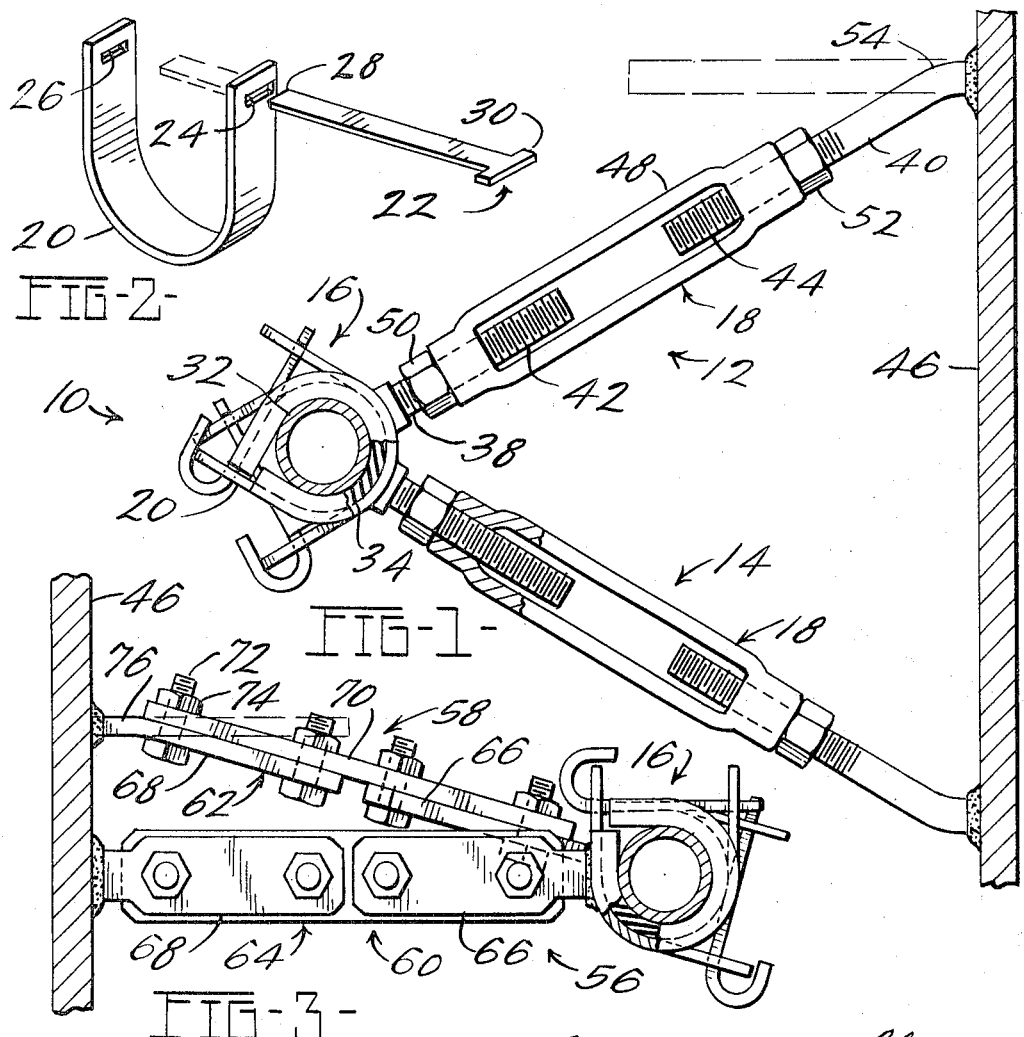
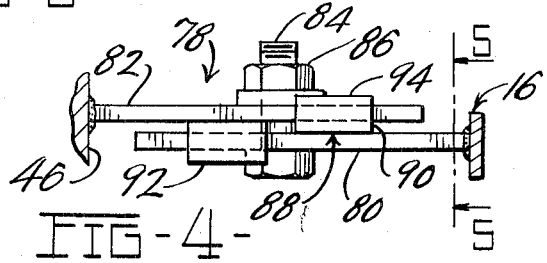
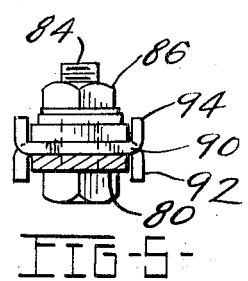
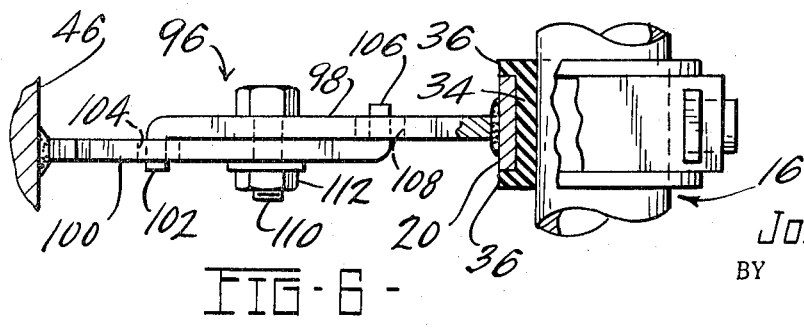
INVENTOR:
JOHN C. JENKINS.
BY
ATT'YS.

United States Patent Office 3,528,634
Patented Sept. 15, 1970

3,528,634
PIPE HANGER
John C. Jenkins, Lorain, Ohio, assignor, by mesne assignments, to TRW Inc., Cleveland, Ohio, a corporation of Ohio
Continuation-in-part of application Ser. No. 680,911, Nov. 6, 1967. This application June 18, 1968, Ser. No. 737,929
Int. Cl. F16l 3/10
U.S. Cl. 248—70     5 Claims

ABSTRACT OF THE DISCLOSURE

A pipe hanger for supporting pipes in ships is designed to withstand substantial shock without deformation. The hanger comprises two elongate members which are welded at common ends to a supporting surface, with clamping members engaging the pipe located at the opposite ends of the elongate members. The elongate members are preferably adjustable in length to position the pipe as desired, and can be adjusted even after the pipe is installed. Several types of adjustments are disclosed.

---

This application is a continuation-in-part of my copending application, Ser. No. 680,911 filed Nov. 6, 1967.

This invention relates to a pipe hanger and particularly to a pipe hanger which is especially resistant to shock.

Many types of pipe hangers are known in the art. Such pipe hangers have not always been reliable for supporting pipes when subjected to shock, particularly when the pipes are supported from a bulkhead or the like. The prior pipe hangers also frequently have lacked the adaptability to support the pipes in particular positions and areas, and lack adjustability, especially after the pipes are installed.

The present invention relates to a pipe hanger for ships and particularly for military ships wherein the hangers must be capable of withstanding substantial shock without damage. The pipe hanger is effective in supporting pipes even under severe shock conditions, whether supporting the pipe from an overhead or from a bulkhead. Further, the pipe hanger embodying the invention is capable of adjustment to provide maximum flexibility in support of the pipe in different applications. In one embodiment, the hanger can be infinitely adjustable, particularly to enable the supported pipe to be placed on a slight slope for drainage purposes.

A pipe hanger according to the invention includes two separate elongate members having common ends welded to the bulkhead or overhead at spaced portions thereof. Each elongate member has a clamping member engageable with the pipe and separately connected thereto. The design enables the hangers to be installed relatively quickly and easily.

It is, therefore, a principal object of the invention to provide a pipe hanger which is especially resistant to shock.

Another object of the invention is to provide a pipe hanger having portions which are adjustable in length.

Other objects and advantages of the invention will be apparent from the following detailed description of preferred embodiments thereof, reference being made to the accompanying drawings, in which:

FIG. 1 is a view in elevation, with parts broken away and with parts in section, of a pipe hanger embodying the invention;

FIG. 2 is a view in perspective of a clamping portion of the pipe hanger of FIG. 1;

FIG. 3 is a side view in elevation, with parts broken away and with parts in section, of a modified pipe hanger embodying the invention;

FIG. 4 is a side view in elevation of a portion of a slightly modified pipe hanger;

FIG. 5 is a view in cross section, taken along the line 5—5 of FIG. 4; and

FIG. 6 is a side view in elevation of a portion of another modified pipe hanger according to the invention.

Referring to FIGS. 1 and 2, a pipe hanger embodying the invention is indicated at 10 and comprises two supporting units 12 and 14, which are identical in this instance. Each of the units 12 and 14 basically comprises a pipe clamping member 16 and an elongate supporting member 18. The pipe clamping member 16 has a U-shaped metal strap 20 (FIG. 2) and a locking bar 22. The strap 20 and the bar 22 can be made in several sizes, each to accommodate a particular diameter of pipe. The strap 20 has elongate openings 24 and 26 in the free ends of the legs thereof through which the bar 22 is inserted after the pipe is in place. When the bar 22 is inserted, a forward end 28 is bent around the end of the strap leg, with a flanged end 30 of the bar then bearing against the other leg of the strap. This enables the pipe-clamping member 16 to be quickly and easily assembled with a pipe 32, as shown in FIG. 1.

A rubber or other resilient liner 34 is located between the pipe 32 and the strap 20 to enable the pipe to be securely held without possible rattling or vibration. The resilient material also cushions the pipe from the metal clamping unit and attenuates sound more effectively. As shown in FIG. 6, the liner 34 preferably has end flanges 36 extending around the edges of the strap 20 to hold the resilient liner in place. Also, particularly for pipes carrying fluids in excess of 200° F., an asbestos liner can be used.

The elongate supporting member 18, in this instance, comprises a pair of threaded end rods or members 38 and 40 having oppositely-threaded end portions 42 and 44. The rod 38 is welded to the center portion of the strap 20, the welding preferably being done in the shop. The rod 38 also can be welded to the sides of the strap, as shown in FIG. 3, to facilitate installation of the pipe. The rod 40 is similarly end welded to a bulkhead or other supporting surface 46. The rod 40 can be separate from the rest of the supporting member 18 and welded to the bulkhead 46 or other supporting surface in a perpendicular position shown in dotted lines, by a known stud welding technique. Otherwise, the rod 40 can be welded when assembled with the rest of the unit 18 by conventional welding. In either case, a threaded connecting member or sleeve 48 is threaded on the portions 42 and 44 of the rods 38 and 40 and can be turned in either direction to move the rods 38 and 40 toward or away from one another for substantially infinite adjustment of the elongate supporting member 18. Lock nuts 50 and 52 are also located on the rods 38 and 40 to securely hold the sleeve 48 on the rods to prevent the possibility of loosening of the pipe hanger. After the rod 40 is welded, it subsequently is bent to form a curved portion 54 to align the clamping member 16 with the corresponding clamping member of the other supporting unit 14, so that the pipe 32 can extend through both of the clamping members.

When both of the supporting units 12 and 14 are assembled with the pipe 32, a secure, triangular supporting configuration results, which provides utmost transverse support for the pipe and prevents possible bending of the hanger, especially when subjected to shock. This is a very important consideration when the pipe hanger is employed in a military vessel, in particular. It may be noted that the rods 40 are welded to the bulkhead 46 at points spaced apart both horizontally and vertically. The clamping members 16 then lie adjacent one another but are preferably slightly spaced apart longitudinally of the pipe 32.

With the turnbuckle type of support afforded by the threaded rods 38 and 40 and the threaded sleeve 48, it will be seen that the pipe 32 can be supported in substantially an infinite number of positions, which is particularly important in the support of a drainage pipe, which must be sloped slightly, e.g. a one inch drop in ten feet. In any case, at least one of the elongate members should have means to change the length thereof to facilitate alignment of the clamping members.

Where adjustment is less critical, a pipe hanger 56 can be employed as shown in FIG. 3. In this instance, two supporting units 58 and 60 differ slightly in the positioning of portions thereof. The units 58 and 60 include the clamping members 16 and elongate supporting members 62 and 64, each of which includes two separate end members or bars 66 and 68. The outer bars 66 are welded to the straps 20 of the clamping member 16. The bar 66 of the elongate member 62 is centrally affixed to the strap 20 with the major transverse dimension of the bar 66 parallel to the pipe to be supported by its clamping member. The bar 68 is welded to the support 46, again by the end welding technique or by conventional welding. The bars 66 and 68 of each elongate member are connected by a connecting bar 70 by means of four bolts 72 and nuts 74 which extend through eight aligned holes in the three bars. The bar 68 of the member 62 is bent at 76 to position the clamping member 16 as desired after the bar 68 is welded.

The elongate supporting member 64 is constructed the same as the member 62 but had the end bar 66 affixed to one leg portion of the strap 20 rather than centrally thereof, and with the major dimension of the bar located transversely to the pipe to be supported by its clamping member. The end bar 68 of the member 64 is welded to the supporting surface 46 in alignment with the bar 66 and with its major transverse dimension also in a vertical position.

With this arrangement of the bars 66 and 68 of the elongate supporting members 62 and 74, the upper member 62 can be bent downwardly to the desired position while the lower member 64 maintains vertical structural rigidity for the hanger due to the positioning of the bars in the vertical plane. The elongate supporting members 62 and 64 can be changed in length by changing the length of the connecting bar 70 or by eliminating the bar 70 and connecting the end bars 66 and 68 in side-by-side relationship. This adjustment provides flexibility for the hanger to meet most situations. Additionally, the connecting bar 70 can have a series of holes formed therein or the bolts 72 can extend through slots in the respective bars 62 and 66, or 70 to provide infinite adjustment for the hanger 56.

By connecting the end bars 66 to circumferentially-spaced portions of the straps 20, the locking bars 22 are located in different positions. Any weakness in the clamping members 16 is then not concentrated at one portion of the pipe. With this positioning of the clamping members, however, one of the end members 66 must be bolted to the connecting bar 70 after the corresponding strap 20 is placed on the pipe.

The hanger of FIG. 4 has a modified elongate supporting member 78 which includes an end bar 80 end welded to the clamping member 16 and an end bar 82 which is welded to the supporting surface 46. The two bars 80 and 82, in this instance, are held together by a single bolt 84 and a single nut 86, the bolt extending through suitable openings in the two bars. The bars 80 and 82 are held in alignment by a connecting member 88 which comprises a plate portion 90 located between and parallel to the end bars, and flanges 92 and 94 which extend over the edges of the bars 80 and 82 to hold them rigidly in alignment.

The hanger of FIG. 6 includes a modified elongate supporting member 96 having end bars 98 and 100. The bar 98 is again affixed to the strap 20 of the clamping member 16 and the bar 100 is affixed to the supporting surface 46. The bar 98 has a rear end tang 102 which extends through a cooperating hole 104 in the bar 100 while the bar 100 has a forward tang 106 extending through an opening 108 in the bar 98. These hold the bars in alignment while they are connected by a bolt 110 and a nut 112. Both the bars 80 and 82 of FIG. 4 and the bars 98 and 100 of FIG. 6 can be provided with a plurality of openings spaced longitudinally thereof to provide adjustment in length to the extent desired.

It will be understood that numerous combinations of the elongate supporting members are possible. The member 18, for example, can be employed with the member 64 and the members 78 and 96 can be used in various combinations with each other or with the elongate members 62 and 64.

Various modifications of the above described embodiments of the invention will be apparent to those skilled in the art, and it is to be understood that such modifications can be made without departing from the scope of the invention, if they are within the spirit and the tenor of the accompanying claims.

I claim:

1. A pipe hanger comprising an elongate supporting member having a first end bar adapted to be affixed to a supporting surface and an end of said second end bar being affixed to a pipe clamping member, the opposite end of each of said first and second end bars bent to provide a tang extending transversely thereof and each of said first and second end bars also having an opening to receive the tang of the other end bar, whereby said tangs and openings hold said end bars together in alignment, and fastener means connecting said first and second end bars and located between the respective tangs and openings of the respective end bars.

2. A pipe hanger according to claim 1 and further including a second elongate supporting member having a first end adapted to be affixed to the supporting surface at a point spaced from the end of said first end bar, and a second end having a pipe-clamping member in alignment with the first pipe-clamping member.

3. A pipe hanger according to claim 2 characterized by said second elongate member having means for changing the effective length thereof.

4. A pipe hanger according to claim 2 wherein said second elongate member comprises a third end bar and fourth end bar, the third end bar having the end adapted to be affixed to the supporting surface and the fourth end member having the end affixed to the second pipe-clamping member to receive a common pipe with said first pipe-clamping member, each of said third and fourth end bars having a tang extending transversely thereof and each of said third and fourth end bars also having an opening to receive the tang of the other of the third and fourth end bars, whereby said tangs and openings of said third and fourth end bars hold said third and fourth end bars together in alignment, and fastener means connecting said third and fourth end bars and located between the respective tangs and openings of the respective third and fourth end bars.

5. A pipe hanger comprising a first, heavy, one-piece metal strap of generally U-shaped configuration, said strap including a central portion and a pair of substantially straight end legs, each of said end legs having at least one elongate opening therein extending parallelly to the axis of a pipe to be held by the hanger and extending transversely of said end legs, a flat locking member extending through both of said leg openings for aiding in holding a portion of the pipe within a space defined by said strap, said flat locking member lying in a plane parallel to the axis of the pipe, said locking member having means formed at one end to prevent movement of said end of said member through one of said openings, the opposite end of said member extending beyond the other of said openings and being transversely bendable to a locking position and effective to urge said legs toward one another to hold the pipe securely, said central portion and said legs of said strap adapted to be positioned adjacent the outer surface of the pipe when in assembled relationship therewith to hold the pipe against transverse movement, first supporting means affixed to the strap for making a connection with a fixed support, a second, heavy one-piece metal strap of generally U-shaped configuration, said second strap including a second central portion and a second pair of substantially straight end legs, each of said second end legs having at least one elongate opening therein extending parallelly to the axis of the pipe to be held by the hanger and extending transversely of said second end legs, a second flat locking member extending through both of said second leg openings for aiding in holding a second portion of the pipe within a space defined by said second strap, said second flat locking member lying in a plane parallel to the axis of the pipe, said second locking member having means formed at one end to prevent movement of said end of said second member through one of said openings of said second end legs, the opposite end of said second member extending beyond the other of said second openings and being transversely bendable to a locking position and effective to urge said second legs toward one another to hold the pipe securely, said second central portion and said second legs of said second strap adapted to be positioned adjacent the outer surface of the pipe when in assembled relationship therewith to hold the pipe further against transverse movement, and second supporting means affixed to the second strap for making a connection with the fixed support at a point spaced from the first supporting means.

References Cited

UNITED STATES PATENTS

| | | | |
|---|---|---|---|
| 2,214,388 | 9/1940 | Summers | 287—64 X |
| 883,138 | 3/1908 | Kirchhoff | 248—70 |
| 1,022,409 | 4/1912 | Foster | 248—70 |
| 1,034,444 | 8/1912 | Hazen | 248—70 |
| 1,132,999 | 3/1915 | Beers | 248—59 X |
| 1,314,724 | 9/1919 | Winchester | 248—59 X |
| 1,737,989 | 12/1929 | Wollenschlager | 248—74 |
| 2,215,283 | 9/1940 | Adler | 248—74 X |
| 2,339,565 | 1/1944 | Goldberg | 248—59 X |
| 2,372,214 | 3/1945 | Loepsinger | 248—59 X |

FOREIGN PATENTS 251,650   5/1964   Australia.

CHANCELLOR E. HARRIS, Primary Examiner

U.S. Cl. X.R.

248—327; 287—64